L. G. TUCKER.
COMBINATION RULE AND DRAFTING INSTRUMENT.
APPLICATION FILED SEPT. 19, 1914.

1,145,719.

Patented July 6, 1915.

WITNESSES
F. D. Sweet
Theo. G. Howard

INVENTOR
Luther G. Tucker
BY
ATTORNEYS

COLUMBIA PLANOGRAPH CO., WASHINGTON, D. C.

UNITED STATES PATENT OFFICE.

LUTHER G. TUCKER, OF OWOSSO, MICHIGAN.

COMBINATION RULE AND DRAFTING INSTRUMENT.

1,145,719.  Specification of Letters Patent.  Patented July 6, 1915.

Application filed September 19, 1914. Serial No. 862,494.

*To all whom it may concern:*

Be it known that I, LUTHER G. TUCKER, a citizen of the United States, and a resident of Owosso, in the county of Shiawassee and State of Michigan, have invented a new and Improved Combination Rule and Drafting Instrument, of which the following is a full, clear, and exact description.

The object of the invention is to provide a new and improved combination rule and drafting instrument arranged to permit of using the instrument as a protractor, square, bevel square, straight edge, compass, scale for obtaining roof pitch, rafter cuts, polygon miter cuts, elbow miter lines and scratch gage.

In order to accomplish the desired result use is made of rule arms, a pivot having a central opening therethrough and connecting the said rule arms with each other, one end of the pivot being threaded, a clamping nut screwing on the threaded end of the said pivot and a handle secured on the other end of the said pivot to allow of clamping the two arms together.

A practical embodiment of the invention is represented in the accompanying drawings forming a part of this specification, in which similar characters of reference indicate corresponding parts in all the views.

Figure 1:
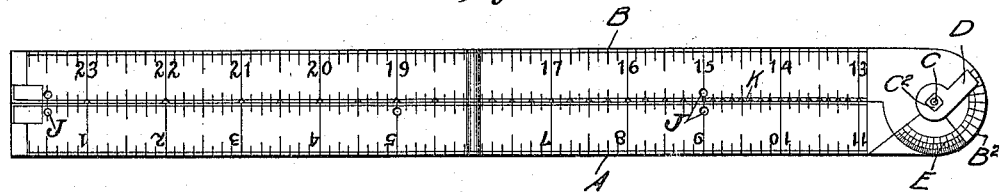
Figure 2:
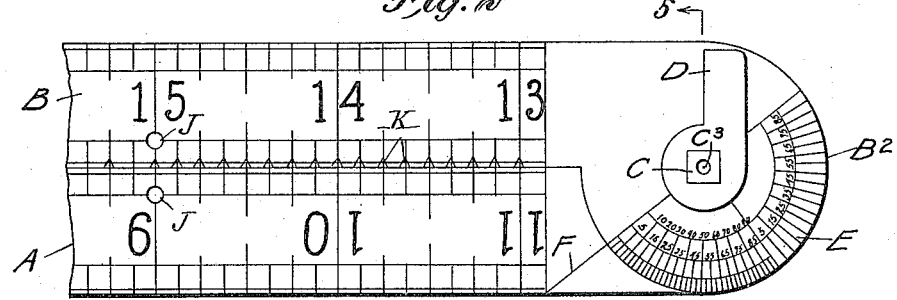
Figure 3:
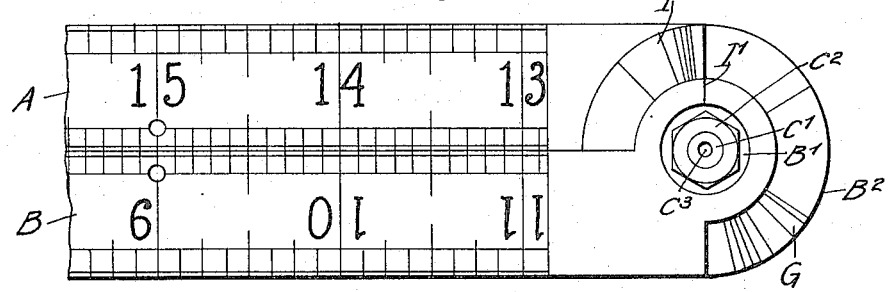
Figure 4:
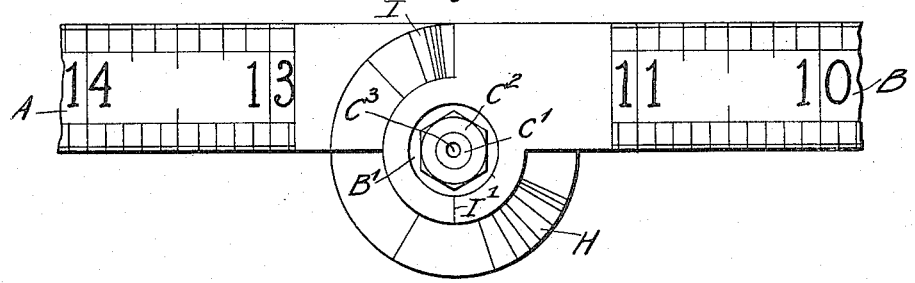
Figure 5:
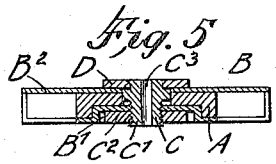

Figure 1 is a face view of the combination rule and drafting instrument with the rule arms in partly folded position and locked; Fig. 2 is an enlarged face view of the same with the rule arms unlocked; Fig. 3 is a face view of the reverse side of the same; Fig. 4 is a face view of the rule arms in extended position to form a straight edge; and Fig. 5 is a cross section of the combination rule and drafting instrument on the line 5—5 of Fig. 2.

The combination rule and drafting instrument is preferably in the form of a two-foot pocket rule having arms A and B graduated in inches and subdivisions or other unit of linear measurement, and each arm is made of the usual two parts hinged together to permit of conveniently folding the rule into a comparatively small space. The arms A and B are pivotally connected with each other by a pivot C to allow of swinging the arms into an angular position one relative to the other for forming an ordinary square or a bevel square and to allow of extending the arms to form a straight edge, as indicated in Fig. 4.

One end of the pivot C is provided with threads C' on which screws a nut $C^2$ held in a recess B' formed in the pivotal end of the arm B. The other end of the pivot C is provided with a handle D overlying the pivotal end of the other side of the pivotal end of the member B to permit the user of the rule and instrument to swing the arm B around so as to cause the nut $C^2$ and the handle D to clamp the pivotal ends of the arms A and B together in whatever position they may be in at the time (see Fig. 1). On swinging the handle D into the position shown in Fig. 2 the arms A and B are loosened to allow of conveniently swinging the arms into a desired angular position or into an extended position, as previously explained. The pivot C is provided with a central aperture $C^3$ for the passage of a pin to permit of swinging the instrument around on this pin as a fulcrum for the purpose hereinafter more fully explained.

The arm B is provided on the pivotal end with a segmental plate $B^2$ provided on its face with a protractor scale E, the degree marks of which are adapted to register with a radial line F arranged on the adjacent face of the arm A so that when the arms are swung into an angular position the degree of the angle formed by the two arms can be conveniently read, it being understood that the arms A and B can be conveniently clamped in the adjusted position by swinging the handle D into clamping position as above explained and shown in Fig. 1. The under side of the plate $B^2$ is provided with a scale G for obtaining roof pitch and rafter cuts by opening the arms A and B until the pivotal end of the arm A registers with the mark indicating the desired roof pitch or rafter cut. It is understood that the arms A and B give the outside angle from a horizontal line for whatever pitch of roof the arms are set according to the scale G. Rafter cuts for any pitch, either standard or otherwise, are laid off by setting the instrument to the pitch or incline of roof and then laying one arm along, say, the bottom side of the rafter at the left-hand end with the other arm pointing to the left and up, then mark along this left arm for bottom horizontal cut, and by holding the left arm along the line just drawn and turning the other arm up to a position of 90° with the edge of the rafter will give the plumb cut for the upper end by placing one arm along the top edge of the rafter with the other arm pointing down and to the left. The under side of the plate B² is further provided with a scale H for miter cuts, the marks of which are laid along the inner edge of the arm A.

The lines of the scale H indicate various sided polygons, it being understood that on opening the arms A and B until the inner edge of the arm A registers with the first line visible gives an angle of miter for a sixteen-sided polygon, the next line for a fourteen-sided polygon, and so on to the last line, which is for a three-sided polygon or triangle. To draw a polygon of any number of sides the arms A and B are opened up to the corresponding line of the scale H and then the arms are clamped together by the movable clamping arm D into clamping position, as previously explained. A pin is now used and passed through the central opening C³ of the pivot C to permit of swinging the instrument around and marking off lines along the inside of the arms A and B until the polygon is completed. A circle may also be described with the pin forming the fulcrum for the instrument to swing around on and the pencil held on any desired point along one of the arms. On the reverse face of the arm A at the pivotal end thereof is arranged a scale I for elbow miter lines (see Fig. 3) and the lines of this scale are adapted to register with an indicating line I' arranged radially on the pivotal end of the arm B. By opening the members A and B until the line I' registers with the desired line of the scale I the desired elbow miter is obtained, that is, the first line of the scale I when in register with the indicating line I' gives the miter for an eight-piece elbow, the second line for a six-piece elbow and so on in a like manner down to a two-piece elbow. In order to lay off the full elevation of elbow, it is necessary to clamp the arms A and B in position after being set to the desired mark as above explained, and then the instrument is used the same as for laying off a polygon, that is, a pin is inserted through the hole C³ for the instrument to swing on.

In order to permit of using the instrument as a compass, the adjacent edges of the arms A and B are provided with registering apertures J for the insertion of points so that when the arms A and B are swung apart the points are opened up a corresponding distance the same as in a regular compass. The inner edge of the arm B is preferably provided with a notch K adapted to form a rest for a pencil when using the instrument for drawing circles, the center of which is formed by a pin inserted through the opening C³ of the pivot C.

The instrument may be used as a scratch gage by opening one arm to full length while placing the other closed arm against the board or surface to be marked and placing a pencil in one of the holes of the open arm and opening or closing the rule to the width desired and drawing it along.

Having thus described my invention, I claim as new and desire to secure by Letters Patent:

1. A combined rule and drawing instrument, comprising rule arms, one of which is provided with a recess, a pivot having a central opening therethrough and connecting the said rule arms with each other, one end of the pivot being threaded, a clamping nut in the recess of the arm and screwing on the said threaded end of the said pivot to clamp the rule arms together, and a handle secured on the other end of the said pivot.

2. A combined rule, and drawing instrument comprising rule arms pivoted together by a pivot having a central opening, the pivot being threaded at one end and provided with an enlargement at its other end, one of the arms being provided at its pivoted end with a fixed segmental plate having on one face a roof pitch scale and a miter scale, the other arm being provided at its pivoted end with a radial line for facilitating the reading of the protractor scale, and a nut on the pivot.

3. A combined rule and drawing instrument, comprising rule arms pivoted together by a pivot having a central opening, one of the arms being provided at its pivoted end with a fixed segmental plate having on one face a protractor scale, and on its other face a roof pitch scale, and a miter scale, the other arm having a radial line for facilitating the reading of the protractor scale, said arm being also provided at its pivoted end with an elbow miter scale adapted to register with a radial indicating line of the first mentioned arm, and means for clamping the arms together to hold them in the adjusted position.

In testimony whereof I have signed my name to this specification in the presence of two subscribing witnesses.

LUTHER G. TUCKER.

Witnesses:
 WARREN PIERPONT,
 HIRAM M. POST.

Copies of this patent may be obtained for five cents each, by addressing the "Commissioner of Patents, Washington, D. C."